(12) United States Patent
Beckmann et al.

(10) Patent No.: US 7,352,727 B2
(45) Date of Patent: Apr. 1, 2008

(54) APPARATUS AND METHOD FOR TRANSMITTING DATA PACKETS

(75) Inventors: Mark Beckmann, Braunschweig (DE);
Martin Hans, Hildesheim (DE);
Michael Eckert, Braunschweig (DE);
Andreas Otte, Celle (DE)

(73) Assignee: Siemens Aktiengesellschaft, Munich (DE)

( * ) Notice: Subject to any disclaimer, the term of this patent is extended or adjusted under 35 U.S.C. 154(b) by 982 days.

(21) Appl. No.: 10/265,692

(22) Filed: Oct. 8, 2002

(65) Prior Publication Data

US 2003/0086404 A1    May 8, 2003

(30) Foreign Application Priority Data

Oct. 8, 2001   (EP)   .................... 01123334

(51) Int. Cl.
*H04Q 7/24*   (2006.01)
(52) U.S. Cl. ........................ 370/338; 370/437
(58) Field of Classification Search ............... 370/338, 370/276, 279, 310, 341, 355, 412, 413, 433, 370/464, 469, 474; 455/436
See application file for complete search history.

(56) References Cited

U.S. PATENT DOCUMENTS

| | | | | |
|---|---|---|---|---|
| 5,208,812 A * | 5/1993 | Dudek et al. | ............... | 370/280 |
| 5,742,588 A * | 4/1998 | Thornberg et al. | ........... | 370/236 |
| 5,793,744 A * | 8/1998 | Kanerva et al. | ............ | 370/209 |
| 5,841,771 A * | 11/1998 | Irwin et al. | ................. | 370/360 |
| 5,901,143 A * | 5/1999 | Rotter et al. | ................ | 370/329 |
| 6,094,575 A | 7/2000 | Anderson et al. | ........... | 455/422 |
| 6,314,095 B1 * | 11/2001 | Loa | .............................. | 370/352 |
| 6,434,133 B1 * | 8/2002 | Hamalainen | ................. | 370/338 |
| 6,529,525 B1 * | 3/2003 | Pecen et al. | ................. | 370/469 |
| 6,618,383 B1 * | 9/2003 | Tomlins | ................... | 370/395.5 |
| 6,665,285 B1 * | 12/2003 | Treadaway et al. | ......... | 370/338 |
| 6,711,164 B1 * | 3/2004 | Le et al. | ..................... | 370/392 |

(Continued)

OTHER PUBLICATIONS

3rd Generation Partnership Project; Technical Specification Group Radio Access Network; Packet Data Convergence Protocol(PDCP) Specification (Release 1999) V3.3.0 (Sep. 2000), 3GPP Organizational Partners.*

(Continued)

*Primary Examiner*—Edan Orgad
*Assistant Examiner*—Lawrence J Burrowes
(74) *Attorney, Agent, or Firm*—Harness, Dickey & Pierce, PLC

(57) ABSTRACT

A communications apparatus having a transmission device, such as a mobile terminal (UE), and a reception device, such as a network control device (RNC), which are linked to one another via channels in a mobile communications network, for transmitting data packets between the transmission device and the reception device which comprise a control data part and a user data part, in which the transmission device has a splitting device for splitting a data packet which is to be transmitted, before transmission, into the control data part and the user data part over various channels of a transmission device which has a channel for the control data part and a channel for the user data part, and the reception device is designed to assemble the control data part and the user data part of the data packet, and also to a method which can be carried out using said communications apparatus.

25 Claims, 2 Drawing Sheets

U.S. PATENT DOCUMENTS

| | | | |
|---|---|---|---|
| 6,725,040 B2* | 4/2004 | Jiang | 455/436 |
| 6,963,587 B2* | 11/2005 | Hannu et al. | 370/477 |
| 6,967,964 B1* | 11/2005 | Svanbro et al. | 370/437 |
| 2002/0001298 A1* | 1/2002 | Tourunen et al. | 370/349 |
| 2004/0028078 A1* | 2/2004 | Beckmann et al. | 370/469 |

OTHER PUBLICATIONS

3$^{rd}$ Generation Partnership Project; Technical Specification Group Radio Access Network; Packet Data convergence Protocol (PDCP) specfication (Release 1999) V3.3.0 (Sep. 2000), 3GPP Organizational Partners.*

User plane architecture of 3$^{rd}$ generation mobile telecommunication network Kalliokulju, J.; Networks, 1999. (ICON '99) Proceedings. IEEE International Conference on Sep. 28-Oct. 1, 1999 pp. 270-278.*

Tuyet Trang Lam et al:"A Perceptually-Tuned Image Coder With Channel-Optimized Trellis-Coded Quantization" Image Processing, 1999. ICIP 99. Proceedings. 1999 International Conference On Kobe, Japan Oct. 24-28, 1999, Piscataway NJ, USA, IEEE, US, Oct. 24, 1999, Seiten 421-425, XP010369148, ISBN: 0-7803-5467-2.

Vu K V et al: "Blocking Probabilities For Inverse Multiplexer In Public Switched Digital Networks" Global Telecommunications Conference, 1995. Conference Record. Communication Theory Mini-Conference, Globecom '95., IEEE Singapore Nov. 13-17, 1995, New York, NY, USA, IEEE, US, Nov. 13, 1995, Seiten 833-837, XP010164485, ISBN: 0-7803-2509-5.

Jeong G et al: "Long-Distance Parallel Data Link Using WDM Transmission With BIT-Skew Compensation" Journal of Lightwave Technology. IEEE. New York, US, Bd. 14, Nr. 5, Mai 1, 1996, Seiten 655-660, XP000598716, ISSN: 0733-8724.

* cited by examiner

Compression — Add SN

In the transmission device

Transmission

Decompression — Remove SN

In the reception device

Two logical channels

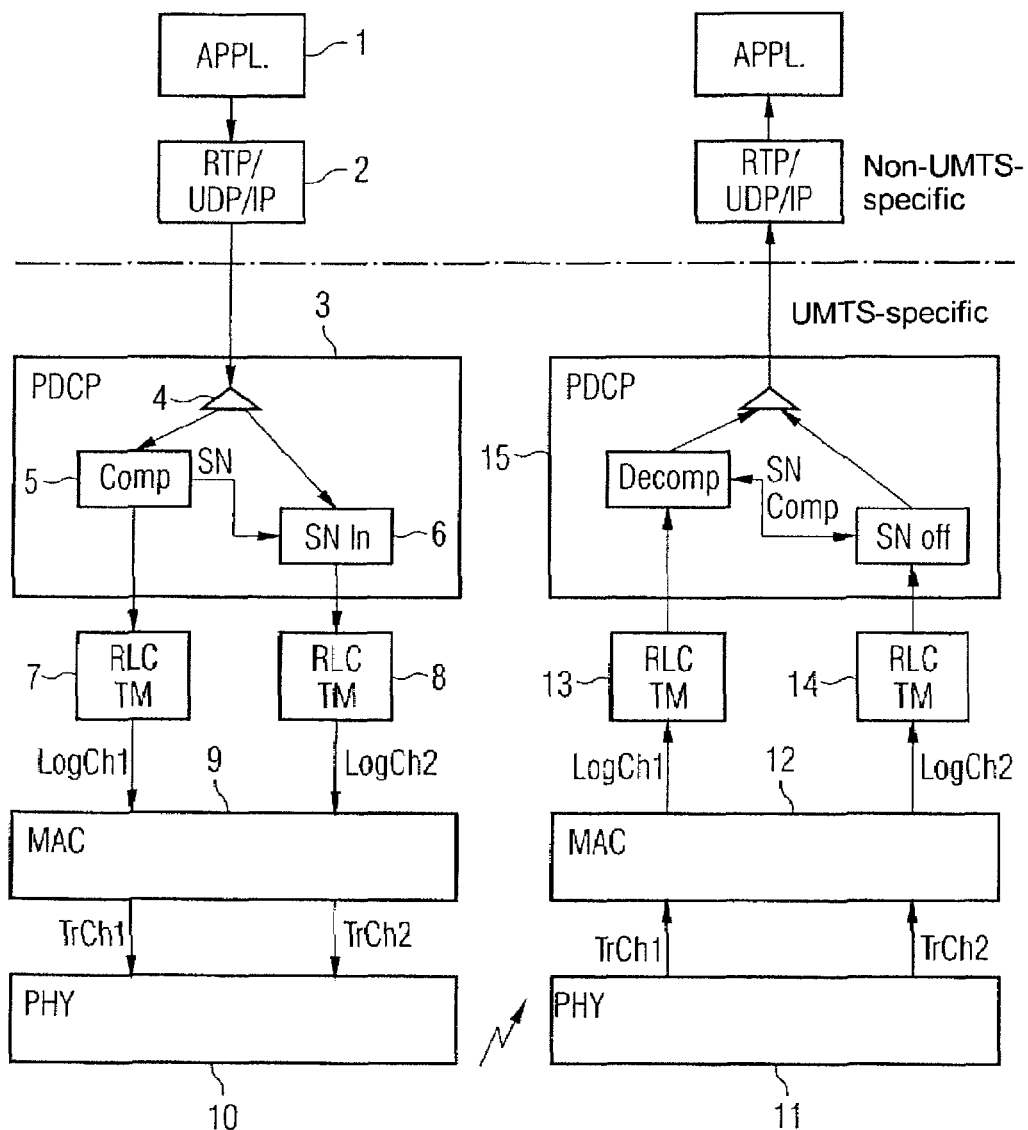

APPARATUS AND METHOD FOR TRANSMITTING DATA PACKETS

The present application hereby claims priority under 35 U.S.C. §119 on European Patent application number 01123334.3 filed Oct. 8, 2001, the entire contents of which are herein incorporated by reference.

FIELD OF THE INVENTION

The present invention generally relates to a communications apparatus having a transmission device, such as a mobile terminal (UE), and a reception device, such as a network control device (RNC), which are linked to one another via channels in a mobile communications network, for transmitting data packets between the transmission device and the reception device which include a control data part and a user data part, and to a method for transmitting data packets which can be carried out using the communications apparatus.

BACKGROUND OF THE INVENTION

A known apparatus is provided, by way of example, by a mobile communications network in which data packets are transmitted between a mobile terminal and a node in the mobile communications network.

The transmitted data packets include a control data part and a user data part. The structure of such a data packet is described below using the example of transmission of the data packet from a mobile terminal (UE) to a node in the mobile communications network (radio network controller, RNC): in the example, it is assumed that the UMTS protocol architecture is present both in the mobile terminal (UE) and in the node in the mobile communications network (RNC). The UMTS protocol architecture for layers 2 and 3, which are relevant in this case, is described, by way of example, in the document "3G TS 25.301, UMTS Protocol Architecture, 3 GPP, March 2000".

The mobile terminal can generate data for various applications. For transmitting voice, a voice code, for example, generates one or more voice data streams or an HTML browser generates non-uniform packet data streams. These data, which are user data, are first possibly modified by protocols for higher layers and are prepared for data transmission in the mobile communications network. In this connection, the User Datagram Protocol (UDP) and the Internet Protocol (IP) can be used. For transmission via the UMTS radio interface, these user data need to be optimized in the various protocols for layer 2 of the UMTS protocol architecture.

It is also possible for non-UMTS-specific protocols to use the UMTS radio interface. The associated service access point within the UMTS protocol architecture is called the radio bearer (RB). The RB service access point is therefore provided above layer 2 and transmits user data transparently from the mobile terminal, via the UMTS radio interface, to the node in the mobile communications network, and vice versa. For data transmission, a particular transmission quality of service (QoS) is stipulated when such an RB service access point is set up, said transmission quality of service being distinguished, by way of example, by a particular, guaranteed data rate, a maximum transmission delay and/or a maximum bit error rate.

When preparing and optimizing the user data, for example voice data streams, various packet-switching-specific protocols, such as IP, TCP, UDP, etc., are executed, the user data part being preceded by control data which are required for routing and for "session setup" in IP-based networks. These control data are not needed for transmitting a data packet via the radio interface of the mobile communications network. For efficient transmission of a data packet, the control data are therefore compressed. This is done by executing suitable algorithms in the PDCP layer of the UMTS protocol architecture, in that case layer 2.

The data packets with a compressed control data part are transferred to the RLC layer of the UMTS protocol architecture for further processing. The RLC layer is used when the length of the data packets coming from the PDCP layer, which data packets can be of any length, needs to be optimized for the radio interface. A further function of the RLC layer is the performance of error correction. If it is necessary neither to optimize the length of the data packets nor to correct errors, the RLC layer can be operated in "transparent mode". Each RB service access point has an associated RLC layer which can also be used for buffer-storing the data present at an RB service access point.

Arranged in relation to the UMTS protocol architecture below the RLC layer is the MAC layer, whose service access points for the RLC layer are called logical channels. The task of the MAC layer is essentially to distribute the data packets received from the RLC layer on the various channels dynamically over the available transport channels. Transport channel refers to a service access point in the physical layer for the MAC layer.

Normally, for each transport channel, permanent coding is set which governs the transmission error rate for data packets and also the necessary bandwidth for transmission. By way of example, convolution coding with the rate 1/3 can be set for a transport channel, so that the data rate transmitted via the radio interface is three times as high as the data rate transmitted from the RLC layer to the MAC layer. The transmission error rate for transmission using such coding is much lower than when convolution coding with the rate 1/2 (doubling of the data rate) or even no coding is used.

Conventionally, an individual transport channel is available for transmitting data packets from a logical channel, which means that a transport channel and hence the transport channel's fixed data coding is defined for every logical channel. However, it is possible for a plurality of logical channels to use the same transport channel.

On the basis of the prior art, the data packets are thus transmitted in full via a particular transport channel for which the coding has been permanently set. This coding increases the volume of data to be transmitted per data packet, specifically to a greater extent the better the error elimination rate and hence the lower the residual error rate after the decoding which is carried out in the reception device—in the present example, at the node in the mobile communications network.

Following transmission, the control data parts of the data packets are removed in order to recover the original user data, such as voice data streams.

The aforementioned compression of the user data part of a data packet in the communication apparatus' transmission device for more efficient transmission of the data packet via the radio interface requires a high transmission quality of service, since incorrect transmissions can spread to a multiplicity of subsequent data packets. Since user data and control data are transmitted using the same coding, the transmission of a data packet is found to require a considerable bandwidth to be available in a transport channel.

SUMMARY OF THE INVENTION

An embodiment of the present invention is based on an object of further developing a communications apparatus and a method where data packets including a user data part and a control data part may be transmitted efficiently.

In terms of the communications apparatus, according to an embodiment of the present invention, the object is achieved for the communications apparatus mentioned in the introduction by virtue of the transmission device having a splitting device for splitting a data packet which is to be transmitted, before transmission, into the control data part and the user data part over various channels of a transmission device which has a channel for the control data part and a channel for the user data part, and the reception device being designed to assemble the control data part and the user data part of the data packet.

As compared with the communications apparatus based on the prior art, the communications apparatus based on an embodiment of the present invention is distinguished, in part, by virtue of there being a splitting device on the transmission device which splits the data packets into their user data part and their control data part. A data packet is then transmitted via two channels of a transmission device. This affords the advantage that the control data part and the user data part can be handled independently for transmission.

By way of example, the coding for the user data part may in many cases need to be less than that for the control data part. In this case, the user data part can be transmitted using a channel of the transmission device whose coding is lower than that for another channel of the transmission device which is used for transmitting the control data part. Hence, in the case of the latter exemplary embodiment, a transport channel bandwidth which is lower overall is sufficient for transmitting a data packet from the transmission device to the reception device.

To recover the data packet in its original form at the reception device, i.e. in the form before it reached the splitting device, the user data part and the control data part are reassembled at the reception device.

Preferably, the channels of the transmission device have different transmission qualities of service. The respective transmission quality of service needs to be matched, on an application case-by-case basis, to the respective requirements for the transmission error rate concerning the control data part and the user data part.

To reassemble a control data part and a user data part belonging to a data packet at the reception device, it is advantageous for the transmission device to have a generating device for generating a sequence number which is added both to the control data part and to the user data part. The sequence number can then be used in the reception device to assemble the data packet as necessary. However, it is also conceivable for a control data part and a user data part which belong together to be linked in another way such that it becomes possible to assemble the data packet on the reception device.

It should be stressed that the communications apparatus according to an embodiment of the present invention generally allows the user data part and the control data part of a data packet to be transmitted differently. In one embodiment of the present invention, the transmission device can have a compression device for compressing the control data part before the data packet is transmitted, and the reception device can have a decompression device for decompressing the control data part after the data packet has been transmitted. With regard to control data parts to be compressed for more efficient data transmission, the advantage arises that compressed control data parts can be protected more heavily against transmission errors than associated transmitted user data. In this case, bandwidth for transmitting the user data is also saved.

In terms of the method, the aforementioned object may be achieved by a method for transmitting a data packet which comprises a control data component and a user data component from a transmission device, such as a mobile terminal (UE), to a reception device, such as a network control device (RMC), via channels in a mobile communications network, having the following steps: a data packet is split into the control data component and the user data component in the transmission device, the control data part and the user data part are transmitted to the reception device on different channels, and the control data part and the user data part of the data packet are assembled in the reception device.

This method can be carried out using the apparatus described above.

In one embodiment, the transmission quality of service for the control data part is different than the transmission quality of service for the user data part. If carrying out the method involves the use of devices having the UMTS protocol architecture, which can be present in a mobile terminal (UE) and in a network control device (RNC), then the transmission quality of service is given preference by adjusting the transport channels.

In step a) of the method, the data packet may have a sequence number generated for it which is added both to the control data part and to the user data part in order for the data packet to be reassembled at the reception device. It is also possible for the control data part to be compressed before transmission in step b) and for the control data part to be decompressed in the reception device.

It will be pointed out that the user data can naturally also be transmitted in compressed form in step b).

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 illustrates a protocol architecture for processing the data packet from FIG. 1.

DETAILED DESCRIPTION OF THE PREFERRED EMBODIMENTS

Figure 1A:
FIGS. 1A, 1B, 1C and 1D each illustrate a schematic illustration of a data packet, including a control data part and a user data part, in various stages before, during and after transmission of the data packet from a transmission device to a reception device.

As an example, the transmission of packet-oriented data from a real-time application is described. It is assumed that the application generates data packets of 160 bits in size at regular time intervals of 20 ms. The application is executed in a transmission device (UE) and is denoted by the reference numeral 1 in FIG. 2. The transmission device (UE) is equipped with the UMTS protocol architecture.

In the transmission device's non-UMTS-specific area, individual data packets have control data headers from the RTP, UDP and IP protocols placed at the front of them, since, following transmission via the UMTS radio interface and the mobile radio network into the packet-switching Internet, the data need to be routed to a reception device. The control data headers are placed at the front in the device 2. The resultant order of the data in a data packet is shown in FIG. 1a, where the control data part is formed by the control data headers from the RTP, UDP and IP protocols. The control data part is followed by the user data part.

As the data packet continues, the UMTS-specific area is now reached in the transmission device. Data packets as shown in FIG. 1A arrive at the transmission device's PDCP layer 3, specifically first a splitting device 4 on which a data packet as shown in FIG. 1A is divided into its user data part and its control data part.

The control data part arrives at a compression device 5. Depending on the stage of compression, the incoming control data parts are in this case compressed to 8 bits, 16 bits or, for example at the start of transmission, 480 bits, with a sequence number SN being generated which is held in the compressed control data parts. The user data part of a data packet, comprising 160 bits, is not compressed.

The sequence number SN generated in the compression device 5 is passed to a device 6 which places the sequence number SN at the front of the user data which are to be transmitted. In the exemplary embodiment, the sequence number SN has been filled with a few bits, so that the total added length of the sequence number corresponds to 8 bits.

From the PDCP layer 3, the compressed control data part is passed to an associated RLC layer 7, and the uncompressed user data part is passed to an associated RLC layer 8. The RLC layers 7, 8 are both operated in transparent mode and pass the respective data to an MAC layer 9 in the UMTS protocol architecture. The data are passed from the two RLC layers 7, 8 to the MAC layer 9 via two separate logical channels LogCh1, LogCh2.

The MAC layer 9 maps the logical channel LogCh1 onto a transport channel TrCh1 and maps the logical channel LogCh2 onto a transport channel TrCh2. The transport channel TrCh1, which is associated with the user data parts of data packets, is configured such that each transmission interval having a length of 20 ms can be used to transmit either 0, 8, 16 or 480 bits, with coding with the rate 1/3 being applied to the control data parts which are to be transmitted. Each transmission interval is used to transmit an individual control data part via the transport channel TrCh1.

The transport channel TrCh2, which is associated with the user data part of a data packet, is configured such that a transmission interval having a length of 20 ms can be used to transmit either 0 or 168 bits, with coding with the rate 1/2 being applied to the data which are to be transmitted. Hence, the transport channel TrCh2 is used to transmit either no data or 160 bits of user data preceded by an 8-bit sequence number SN in a particular transmission interval.

The control data parts and user data parts are transmitted via the physical channels of the physical layer in the UMTS protocol architecture.

At the reception device, the data to be transmitted first arrive at said reception device's physical layer 11. From the physical layer of the reception device 11, a user data part and a control data part arrive at the reception device's PDCP layer 15 via the MAC layer 12 and two RLC layers 13, 14. The reception device is also equipped with the UMTS protocol architecture.

The PDCP layer 15 now identifies the user data parts and control data parts which have the same sequence number SN as belonging to one another and decompresses the control data parts and removes the first 8 bits from the user data part. Next, the decompressed control data parts and the user data parts are assembled to form the original data packet, which is finally passed to the higher—in the present exemplary embodiment, no longer UMTS-specific—layers, such as IP, UDP, RTP, and to an application for further processing.

Figure 1B:
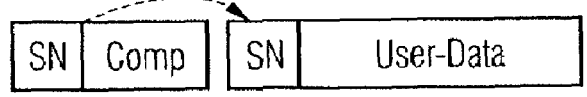
Figure 1C:
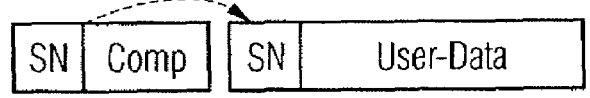
Figure 1D:

When it has left the transmission device's PDCP layer 3, a data packet thus adopts the form of the data in figure 1B and retains this form during transmission, specifically until it reaches the reception device's PDCP layer 15. FIG. 1C shows the data before arrival at the reception device's PDCP layer 15. When they have left the reception device's PDCP layer 15, the data adopt the form in FIG. 1D, which matches that in FIG. 1A.

A rough estimate of the bandwidth saving which can be provided by this invention can be made as follows:

It is assumed that the control data parts are continually compressed with an average compressed control data length of 16 bits, the user data part is adequately protected with a coded rate of 1/2, and the compressed control data parts require a coding rate of 1/3. Resultant bandwidth limit values for the prior art and for the apparatus based on the invention are shown in the table below:

|  | Prior Art | Invention |
|---|---|---|
| before coding: |  |  |
| Control data part: | 16 bit | 16 bit |
| User data part: | 160 bit | 168 bit |
| Total: | 176 bit |  |
| Coding rate: | 1/3 | 1/3 or 1/2 |
| after coding: |  |  |
| Control data part: | 48 bit | 48 bit |
| User data part: | 480 bit | 336 bit |
| Total: | 528 bit | 384 bit |
| Transmission interval: | 20 ms | 20 ms |
| Transmission data rate: | 26400 bit/s | 19200 bit/s |

In this example, the transmission data rate is thus reduced from 26 400 bit/s to 19 200 bit/s, and hence considerable bandwidth in the transport channels is saved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A communications apparatus, comprising:
    a transmission device and a reception device being linked to one another via channels in a mobile communications network, the mobile communications network for transmitting data packets between the transmission device and the reception device, the transmitting data packets including a control data part and a user data part, wherein the transmission device includes a splitting device for splitting a data packet for transmission, before transmission thereof, into the control data part and the user data part over various channels of a transmission device, the transmission device having a channel for the control data part and a channel for the user data part, and the reception device is designed to assemble the control data part and the user data part of the data packet.

2. The apparatus as claimed in claim 1, wherein the channels have different transmission qualities of service.

3. The apparatus as claimed in claim 2, wherein the transmission device has a generating device for generating a sequence number (SN) which is added both to the control data part and to the user data part.

4. The apparatus as claimed in claim 2, wherein the transmission device includes a compression device for compressing the control data part before the data packet is transmitted, and the reception device has a decompression device for decompressing the control data part after the data packet has been transmitted.

5. The apparatus as claimed in claim 1, wherein the transmission device has a generating device for generating a sequence number (SN) which is added both to the control data part and to the user data part.

6. The apparatus as claimed in claim 5, wherein the transmission device includes a compression device for compressing the control data part before the data packet is transmitted, and the reception device has a decompression device for decompressing the control data part after the data packet has been transmitted.

7. The apparatus as claimed in claim 5, wherein the transmission device and the reception device are each equipped with the UMTS protocol architecture.

8. The apparatus as claimed in claim 7, wherein the generating device is contained in a PDCP layer of the transmission device.

9. The apparatus as claimed in claim 1, wherein the transmission device includes a compression device for compressing the control data part before the data packet is transmitted, and the reception device has a decompression device for decompressing the control data part after the data packet has been transmitted.

10. The apparatus as claimed in claim 9, wherein the transmission device and the reception device are each equipped with the UMTS protocol architecture.

11. The apparatus as claimed in claim 10, wherein the compression device is contained in a PDCP layer of the transmission device, and the decompression device is contained in a PDCP layer of the reception device.

12. The apparatus as claimed in claim 1, wherein the transmission device and the reception device are each equipped with the UMTS protocol architecture.

13. The apparatus as claimed in claim 12, wherein the splitting device is contained in a PDCP layer of a UMTS protocol architecture associated with the transmission device.

14. The apparatus as claimed in claim 12, wherein the various channels of the transmission device are formed by various logical channels provided between an RLC layer which is associated with the PDCP layer, and an MAC layer, and by various transport channels provided between the MAC layer and the physical layer.

15. The apparatus as claimed in claim 1, wherein the transmission device is a mobile terminal.

16. The apparatus as claimed in claim 1, wherein the reception device is a network control device.

17. A method for transmitting a data packet having a control data component and a user data component from a transmission device to a reception device, via channels in a mobile communications network, comprising:

splitting the data packet into the control data component and the user data component in the transmission device;

transmitting the control data part and the user data part to the reception device on different channels; and assembling the control data part and the user data part of the data packet in the reception device.

18. The method as claimed in claim 17, wherein, in the transmitting of the control data part and the user data part, the transmission quality of service for the control data part is different than the transmission quality of service for the user data part.

19. The method as claimed in claim 18, wherein, in the of splitting the data packet, the data packet has a sequence number generated for it which is added both to the control data part and to the user data part.

20. The method as claimed in claim 17, wherein, in the splitting of the data packet, the data packet has a sequence number generated therefor, which is added both to the control data part and to the user data part.

21. The method as claimed in claim 17, wherein, before the transmitting of the control data part and the user data part, the control data part is compressed in the transmission device, and, after the transmitting of the control data part and the user data part, the control data part is decompressed in the reception device.

22. The method as claimed in claim 17, wherein the transmission device and the reception device are each equipped with the UMTS protocol architecture.

23. The method as claimed in claim 22, wherein the splitting of the data packet is carried out in a PDCP layer in a UMTS protocol architecture of the transmission device.

24. The method of claim 17, wherein the transmission device is a mobile terminal.

25. The method of claim 17, wherein the reception device is a network control device.

* * * * *